US012131074B2

(12) United States Patent
Bono

(10) Patent No.: US 12,131,074 B2
(45) Date of Patent: Oct. 29, 2024

(54) METHODS AND SYSTEMS FOR STORING DATA IN A DISTRIBUTED SYSTEM USING GPUS

(71) Applicant: EMC IP Holding Company LLC, Hopkinton, MA (US)

(72) Inventor: Jean-Pierre Bono, Westboro, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 38 days.

(21) Appl. No.: 17/512,624

(22) Filed: Oct. 27, 2021

(65) Prior Publication Data

US 2023/0126511 A1   Apr. 27, 2023

(51) Int. Cl.
*G06F 12/00* (2006.01)
*G06F 3/06* (2006.01)
*G06F 12/02* (2006.01)
*G06F 13/00* (2006.01)

(52) U.S. Cl.
CPC .......... *G06F 3/0664* (2013.01); *G06F 3/0611* (2013.01); *G06F 3/0644* (2013.01); *G06F 3/0659* (2013.01); *G06F 3/067* (2013.01); *G06F 12/0238* (2013.01); *G06F 2212/7201* (2013.01)

(58) Field of Classification Search
CPC .... G06F 3/0664; G06F 3/0611; G06F 3/0644; G06F 3/0659; G06F 3/067; G06F 12/0238; G06F 2212/7201
USPC .......................................................... 711/154
See application file for complete search history.

(56) References Cited

U.S. PATENT DOCUMENTS

| 1,651,470 | A | * | 12/1927 | Sadtler | .................... D06P 5/007 |
| | | | | | 8/918 |
| 5,394,537 | A | | 2/1995 | Courts et al. | |
| 5,946,686 | A | | 8/1999 | Schmuck et al. | |
| 6,038,570 | A | | 3/2000 | Hitz et al. | |

(Continued)

FOREIGN PATENT DOCUMENTS

| WO | 2016196766 A2 | 12/2016 |
| WO | 2017079247 A1 | 5/2017 |

OTHER PUBLICATIONS

Adam Thompson et al., GPUDirect Storage: A Direct Path Between Storage and GPU Memory, Technical Blog, Aug. 6, 2019, 8 pages, NVIDIA Corporation, https://developer.nvidia.com/blog/gpudirect-storage/, accessed on May 20, 2022.

(Continued)

*Primary Examiner* — Sheng Jen Tsai
(74) *Attorney, Agent, or Firm* — Chamberlain, Hrdlicka, White, Williams & Aughtry; Aly Z. Dossa

(57) ABSTRACT

In general, embodiments relate to a method for storing data, the method comprising generating, by a memory hypervisor module executing on a client application node, at least one input/output (I/O) request, wherein the at least one I/O request specifies a location in a storage pool and a physical address of the data in a graphics processing unit (GPU) memory in a GPU on the client application node, wherein the location is determined using a data layout, and wherein the physical address is determined using a GPU module and issuing, by the memory hypervisor module, the at least one I/O request to the storage pool, wherein processing the at least one I/O request results in at least a portion of the data being stored at the location.

20 Claims, 10 Drawing Sheets

(56) References Cited

U.S. PATENT DOCUMENTS

| | | | |
|---|---|---|---|
| 6,067,541 A | 5/2000 | Raju et al. | |
| 6,119,208 A | 9/2000 | White et al. | |
| 6,138,126 A | 10/2000 | Hitz et al. | |
| 6,412,017 B1 | 6/2002 | Straube et al. | |
| 6,681,303 B1 | 1/2004 | Watanabe et al. | |
| 6,725,392 B1 | 4/2004 | Frey et al. | |
| 6,751,702 B1 | 6/2004 | Hsieh et al. | |
| 6,985,995 B2 | 1/2006 | Holland et al. | |
| 7,191,198 B2 | 3/2007 | Asano et al. | |
| 7,516,285 B1 | 4/2009 | Haynes et al. | |
| 7,653,682 B2 | 1/2010 | Erasani et al. | |
| 7,685,126 B2 | 3/2010 | Patel et al. | |
| 8,112,395 B2 | 2/2012 | Patel et al. | |
| 8,117,388 B2 | 2/2012 | Jernigan, IV | |
| 8,195,760 B2 | 6/2012 | Lacapra et al. | |
| 8,312,242 B2 | 11/2012 | Casper et al. | |
| 8,364,999 B1* | 1/2013 | Adessa | G06F 1/3203 713/323 |
| 8,370,910 B2 | 2/2013 | Kamei et al. | |
| 8,407,265 B1 | 3/2013 | Scheer et al. | |
| 8,429,360 B1 | 4/2013 | Iyer et al. | |
| 8,510,265 B1 | 8/2013 | Boone et al. | |
| 8,566,673 B2 | 10/2013 | Kidney et al. | |
| 8,818,951 B1 | 8/2014 | Muntz et al. | |
| 8,924,684 B1 | 12/2014 | Vincent | |
| 9,069,553 B2 | 6/2015 | Zaarur et al. | |
| 9,104,321 B2 | 8/2015 | Cudak et al. | |
| 9,172,640 B2 | 10/2015 | Vincent et al. | |
| 9,250,953 B2 | 2/2016 | Kipp | |
| 9,300,578 B2 | 3/2016 | Chudgar et al. | |
| 9,330,103 B1 | 5/2016 | Bono et al. | |
| 9,443,095 B2 | 9/2016 | Lähteenmäki | |
| 9,483,369 B2 | 11/2016 | Sporel | |
| 9,485,310 B1 | 11/2016 | Bono et al. | |
| 9,760,393 B2 | 9/2017 | Hiltgen et al. | |
| 9,779,015 B1 | 10/2017 | Oikarinen et al. | |
| 9,886,735 B2* | 2/2018 | Soum | G06T 1/60 |
| 9,990,253 B1 | 6/2018 | Rajimwale et al. | |
| 10,031,693 B1 | 7/2018 | Bansode et al. | |
| 10,156,993 B1 | 12/2018 | Armangau et al. | |
| 10,209,899 B2 | 2/2019 | Oshins et al. | |
| 10,248,610 B2* | 4/2019 | Menachem | G06F 11/3041 |
| 10,346,297 B1 | 7/2019 | Wallace | |
| 10,348,813 B2 | 7/2019 | Abali et al. | |
| 10,649,867 B2 | 5/2020 | Roberts et al. | |
| 10,693,962 B1 | 6/2020 | Neumann | |
| 10,740,005 B1 | 8/2020 | Ives et al. | |
| 11,397,545 B1* | 7/2022 | Hamid | G06F 3/0604 |
| 11,438,231 B2 | 9/2022 | Gardner et al. | |
| 11,481,261 B1* | 10/2022 | Frandzel | G06F 9/4881 |
| 11,570,243 B2* | 1/2023 | Camargos | G06F 16/182 |
| 11,574,381 B2* | 2/2023 | Long | G06F 9/5027 |
| 11,604,610 B2 | 3/2023 | Bono et al. | |
| 11,604,706 B2* | 3/2023 | Nara | G06F 11/1461 |
| 11,651,470 B2* | 5/2023 | Zad Tootaghaj | G06F 9/4881 345/504 |
| 11,677,633 B2 | 6/2023 | Bono et al. | |
| 11,693,572 B2* | 7/2023 | Naik | G06F 3/0619 711/154 |
| 11,714,568 B2* | 8/2023 | Kilaru | G06F 3/0659 711/162 |
| 11,748,143 B2* | 9/2023 | Kumar | G06F 3/0649 718/1 |
| 11,789,830 B2* | 10/2023 | Jain | G06F 11/1469 714/4.11 |
| 11,829,256 B2* | 11/2023 | Bansod | H04L 67/1095 |
| 11,836,047 B2* | 12/2023 | Madan | G06F 11/1469 |
| 2003/0074486 A1 | 4/2003 | Anastasiadis et al. | |
| 2004/0062245 A1 | 4/2004 | Sharp et al. | |
| 2004/0172073 A1 | 9/2004 | Busch et al. | |
| 2004/0210761 A1 | 10/2004 | Eldar et al. | |
| 2005/0004925 A1 | 1/2005 | Stahl et al. | |
| 2005/0114557 A1 | 5/2005 | Arai et al. | |
| 2005/0172097 A1 | 8/2005 | Voigt et al. | |
| 2006/0020745 A1 | 1/2006 | Conley et al. | |
| 2006/0101081 A1 | 5/2006 | Lin et al. | |
| 2006/0117135 A1 | 6/2006 | Thind et al. | |
| 2006/0200858 A1 | 9/2006 | Zimmer et al. | |
| 2006/0265605 A1 | 11/2006 | Ramezani | |
| 2007/0011137 A1 | 1/2007 | Kodama | |
| 2007/0022138 A1 | 1/2007 | Erasani et al. | |
| 2007/0106861 A1 | 5/2007 | Miyazaki et al. | |
| 2007/0136391 A1 | 6/2007 | Anzai et al. | |
| 2007/0143542 A1 | 6/2007 | Watanabe et al. | |
| 2007/0245006 A1 | 10/2007 | Lehikoinen et al. | |
| 2008/0154985 A1 | 6/2008 | Childs et al. | |
| 2008/0184000 A1 | 7/2008 | Kawaguchi | |
| 2008/0270461 A1 | 10/2008 | Gordon et al. | |
| 2009/0077097 A1 | 3/2009 | Lacapra et al. | |
| 2009/0144416 A1 | 6/2009 | Chatley et al. | |
| 2009/0150639 A1 | 6/2009 | Ohata | |
| 2009/0248957 A1 | 10/2009 | Tzeng | |
| 2009/0300302 A1 | 12/2009 | Vaghani | |
| 2009/0307538 A1 | 12/2009 | Hernandez et al. | |
| 2009/0313415 A1 | 12/2009 | Sabaa et al. | |
| 2010/0049754 A1 | 2/2010 | Takaoka et al. | |
| 2010/0076933 A1 | 3/2010 | Hamilton et al. | |
| 2010/0100664 A1 | 4/2010 | Shimozono | |
| 2010/0115009 A1 | 5/2010 | Callahan et al. | |
| 2010/0274772 A1 | 10/2010 | Samuels | |
| 2010/0306500 A1 | 12/2010 | Mimatsu | |
| 2011/0161281 A1 | 6/2011 | Sayyaparaju et al. | |
| 2011/0218966 A1 | 9/2011 | Barnes et al. | |
| 2011/0289519 A1 | 11/2011 | Frost | |
| 2011/0314246 A1 | 12/2011 | Miller et al. | |
| 2012/0096059 A1 | 4/2012 | Shimizu et al. | |
| 2012/0158882 A1 | 6/2012 | Oehme | |
| 2012/0250682 A1 | 10/2012 | Vincent et al. | |
| 2012/0250686 A1 | 10/2012 | Vincent et al. | |
| 2013/0139000 A1 | 5/2013 | Nakamura et al. | |
| 2013/0179481 A1 | 7/2013 | Halevy | |
| 2013/0227236 A1 | 8/2013 | Flynn et al. | |
| 2013/0346444 A1 | 12/2013 | Makkar et al. | |
| 2014/0089619 A1 | 3/2014 | Khanna et al. | |
| 2014/0171190 A1* | 6/2014 | Diard | A63F 13/53 463/31 |
| 2014/0188953 A1 | 7/2014 | Lin et al. | |
| 2014/0195564 A1 | 7/2014 | Talagala et al. | |
| 2014/0237184 A1 | 8/2014 | Kazar et al. | |
| 2014/0279859 A1 | 9/2014 | Benjamin-deckert et al. | |
| 2015/0088882 A1 | 3/2015 | Hartman et al. | |
| 2015/0212909 A1 | 7/2015 | Sporel | |
| 2015/0356078 A1 | 12/2015 | Kishimoto et al. | |
| 2016/0080492 A1 | 3/2016 | Cheung | |
| 2016/0117254 A1 | 4/2016 | Susarla et al. | |
| 2016/0188628 A1 | 6/2016 | Hartman et al. | |
| 2016/0259687 A1 | 9/2016 | Yoshihara et al. | |
| 2016/0275098 A1 | 9/2016 | Joseph | |
| 2016/0292179 A1 | 10/2016 | Von Muhlen et al. | |
| 2016/0342588 A1 | 11/2016 | Judd | |
| 2017/0131920 A1* | 5/2017 | Oshins | G06F 3/0664 |
| 2017/0132163 A1 | 5/2017 | Aslot et al. | |
| 2017/0169233 A1 | 6/2017 | Hsu et al. | |
| 2017/0249215 A1 | 8/2017 | Gandhi | |
| 2017/0286153 A1 | 10/2017 | Bak et al. | |
| 2018/0032249 A1 | 2/2018 | Makhervaks et al. | |
| 2018/0095915 A1 | 4/2018 | Prabhakar et al. | |
| 2018/0109471 A1 | 4/2018 | Chang et al. | |
| 2018/0212825 A1 | 7/2018 | Umbehocker et al. | |
| 2018/0307472 A1 | 10/2018 | Paul et al. | |
| 2019/0044946 A1 | 2/2019 | Hwang et al. | |
| 2019/0238590 A1 | 8/2019 | Talukdar et al. | |
| 2019/0339896 A1 | 11/2019 | Mccloskey et al. | |
| 2019/0347204 A1 | 11/2019 | Du et al. | |
| 2019/0370042 A1 | 12/2019 | Gupta et al. | |
| 2019/0377892 A1 | 12/2019 | Ben Dayan et al. | |
| 2020/0004452 A1 | 1/2020 | Kobayashi et al. | |
| 2020/0110554 A1 | 4/2020 | Yang | |
| 2020/0241805 A1 | 7/2020 | Armangau et al. | |
| 2021/0026774 A1 | 1/2021 | Lim | |
| 2021/0042141 A1* | 2/2021 | De Marco | G06F 16/13 |
| 2021/0117246 A1* | 4/2021 | Lal | G06F 9/3814 |
| 2021/0132870 A1* | 5/2021 | Bono | G06F 3/065 |

(56) References Cited

U.S. PATENT DOCUMENTS

| | | | |
|---|---|---|---|
| 2021/0133109 A1* | 5/2021 | Bono | G06F 9/5016 |
| 2021/0160318 A1* | 5/2021 | Sajeepa | G06F 3/0655 |
| 2021/0173588 A1* | 6/2021 | Kannan | G06F 3/061 |
| 2021/0173744 A1* | 6/2021 | Agrawal | G06F 16/184 |
| 2021/0182190 A1* | 6/2021 | Gao | G06F 12/0246 |
| 2021/0191638 A1* | 6/2021 | Miladinovic | G11C 29/021 |
| 2021/0232331 A1* | 7/2021 | Kannan | G06N 20/00 |
| 2021/0240611 A1* | 8/2021 | Tumanova | G06F 3/061 |
| 2021/0243255 A1* | 8/2021 | Perneti | G06F 11/1456 |
| 2021/0286517 A1* | 9/2021 | Karr | G06F 3/0644 |
| 2021/0286546 A1* | 9/2021 | Hodgson | G06F 12/0246 |
| 2021/0303164 A1* | 9/2021 | Grunwald | G06F 3/0629 |
| 2021/0303519 A1* | 9/2021 | Periyagaram | G06F 16/17 |
| 2021/0303522 A1* | 9/2021 | Periyagaram | G06F 16/178 |
| 2021/0303523 A1* | 9/2021 | Periyagaram | G06F 16/13 |
| 2021/0311641 A1* | 10/2021 | Prakashaiah | G06F 3/0619 |
| 2021/0314404 A1* | 10/2021 | Glek | G06F 11/2041 |
| 2021/0318827 A1* | 10/2021 | Bernat | G06F 11/108 |
| 2021/0326048 A1* | 10/2021 | Karr | G06F 3/0683 |
| 2021/0326223 A1* | 10/2021 | Grunwald | G06F 9/44505 |
| 2021/0334206 A1* | 10/2021 | Colgrove | G06F 3/0638 |
| 2021/0349636 A1* | 11/2021 | Gold | G06F 13/28 |
| 2021/0349649 A1* | 11/2021 | Lee | G06F 3/0644 |
| 2021/0349653 A1* | 11/2021 | DeWitt | G06F 11/0727 |
| 2021/0373973 A1* | 12/2021 | Ekins | G06F 9/5088 |
| 2021/0382800 A1* | 12/2021 | Lee | G06F 11/20 |
| 2022/0011945 A1* | 1/2022 | Coleman | G06F 3/0631 |
| 2022/0011955 A1* | 1/2022 | Juch | G06F 3/0632 |
| 2022/0019350 A1* | 1/2022 | Karr | G06F 3/0604 |
| 2022/0019366 A1* | 1/2022 | Freilich | G06F 21/6218 |
| 2022/0019367 A1* | 1/2022 | Freilich | G06F 3/067 |
| 2022/0019505 A1* | 1/2022 | Lee | G06F 11/2023 |
| 2022/0027051 A1* | 1/2022 | Kant | G06F 3/0605 |
| 2022/0027064 A1* | 1/2022 | Botes | G06F 11/1435 |
| 2022/0027472 A1* | 1/2022 | Golden | G06F 21/78 |
| 2022/0035074 A1* | 2/2022 | Schultz | G06F 11/3409 |
| 2022/0050858 A1* | 2/2022 | Karr | G06F 11/3466 |
| 2022/0075546 A1* | 3/2022 | Potyraj | G06F 11/2094 |
| 2022/0075760 A1* | 3/2022 | Wu | G06F 16/188 |
| 2022/0137855 A1* | 5/2022 | Irwin | G06F 3/0671 711/154 |
| 2022/0138223 A1* | 5/2022 | Sonner | G06F 16/27 707/620 |
| 2022/0147253 A1* | 5/2022 | Sajeepa | G06F 3/0632 |
| 2022/0147365 A1* | 5/2022 | Bernat | G06F 11/1076 |
| 2022/0156152 A1* | 5/2022 | Gao | G06F 3/0639 |
| 2022/0164120 A1* | 5/2022 | Kannan | G06F 3/0604 |
| 2022/0171648 A1* | 6/2022 | Rodriguez | G06F 9/4401 |
| 2022/0180950 A1* | 6/2022 | Kannan | G06F 11/076 |
| 2022/0197505 A1* | 6/2022 | Kannan | G06F 3/061 |
| 2022/0197689 A1* | 6/2022 | Hotinger | G06F 9/45558 |
| 2022/0206691 A1* | 6/2022 | Lee | G06F 3/0688 |
| 2022/0206696 A1* | 6/2022 | Gao | G06F 3/061 |
| 2022/0206702 A1* | 6/2022 | Gao | G06F 3/0647 |
| 2022/0206910 A1* | 6/2022 | Vaideeswaran | G06F 11/2007 |
| 2022/0215111 A1* | 7/2022 | Ekins | G06F 21/6218 |
| 2022/0229851 A1 | 7/2022 | Danilov et al. | |
| 2022/0232075 A1* | 7/2022 | Emerson | H04L 67/1097 |
| 2022/0236904 A1* | 7/2022 | Miller | G06F 3/0608 |
| 2022/0253216 A1* | 8/2022 | Grunwald | G06F 3/0607 |
| 2022/0253389 A1* | 8/2022 | Fay | H04L 9/50 |
| 2022/0261164 A1* | 8/2022 | Zhuravlev | G06F 3/0638 |
| 2022/0261170 A1* | 8/2022 | Vohra | G06F 3/0688 |
| 2022/0261178 A1* | 8/2022 | He | G06F 12/1027 |
| 2022/0261286 A1* | 8/2022 | Wang | G06F 3/0611 |
| 2022/0263897 A1* | 8/2022 | Karr | G06F 11/1448 |
| 2022/0269418 A1* | 8/2022 | Black | G06F 3/061 |
| 2022/0291837 A1* | 9/2022 | Shao | G06F 3/064 |
| 2022/0291858 A1* | 9/2022 | DeWitt | G06F 12/0253 |
| 2022/0291986 A1* | 9/2022 | Klein | G06F 3/0653 |
| 2022/0300193 A1* | 9/2022 | Gao | G06F 3/0656 |
| 2022/0300198 A1* | 9/2022 | Gao | G06F 11/3466 |
| 2022/0300413 A1* | 9/2022 | Kannan | G06F 3/061 |
| 2022/0318264 A1* | 10/2022 | Jain | G06F 11/2094 |
| 2022/0334725 A1* | 10/2022 | Mertes | G06F 16/275 |
| 2022/0334929 A1* | 10/2022 | Potyraj | G06F 3/067 |
| 2022/0334990 A1* | 10/2022 | Karr | G06F 3/0629 |
| 2022/0335005 A1* | 10/2022 | Fernandez | G06F 16/178 |
| 2022/0335009 A1* | 10/2022 | Paul | G06F 16/11 |
| 2022/0350495 A1* | 11/2022 | Lee | G06F 3/065 |
| 2022/0350515 A1 | 11/2022 | Bono et al. | |
| 2022/0350543 A1* | 11/2022 | Bono | G06F 3/0664 |
| 2022/0350544 A1* | 11/2022 | Bono | G06F 3/067 |
| 2022/0350545 A1* | 11/2022 | Bono | G06F 16/196 |
| 2022/0350702 A1* | 11/2022 | Bono | G06F 3/0641 |
| 2022/0350778 A1* | 11/2022 | Bono | G06F 16/182 |
| 2022/0414817 A1* | 12/2022 | Zad Tootaghaj | G06F 9/5072 |
| 2023/0126664 A1* | 4/2023 | Bono | G06F 9/45558 709/203 |
| 2023/0127387 A1* | 4/2023 | Bono | G06F 3/0631 707/694 |
| 2023/0130893 A1* | 4/2023 | Bono | G06F 3/067 711/171 |
| 2023/0131787 A1* | 4/2023 | Bono | H04L 41/08 709/221 |

OTHER PUBLICATIONS

Metz Joachim, "Hierarchical File System (HFS)" Nov. 4, 2020, Retrieved from the Internet on Dec. 16, 2021 https://github.com/libyal/libfshfs/blob/c52bf4a36bca067510d0672ccce6d449a5a85744/documentation/Hierarchical%20System%20 (HFS).asciidoc (93 pages).

International Search Report and Written Opinion issued in corresponding Application No. PCT/US2021/030138, dated Jan. 21, 2022 (16 pages).

International Search Report and Written Opinion issued in corresponding Application No. PCT/US2021/030141 dated Jan. 4, 2022 (11 pages).

Y. Yamato, Proposal of Automatic GPU Offloading Method from Various Language Applications Proposal of Automatic GPU Offloading Method from Various Language Applications, 2021, pp. 400-404, 10.1109/ICIET51873.2021.9419618 (5 pages).

* cited by examiner

METHODS AND SYSTEMS FOR STORING DATA IN A DISTRIBUTED SYSTEM USING GPUS

BACKGROUND

Applications generate and/or manipulate large amounts of data. Thus, the performance of these applications is typically impacted by the manner in which the applications may read and/or write data.

DETAILED DESCRIPTION

Figure 1A:
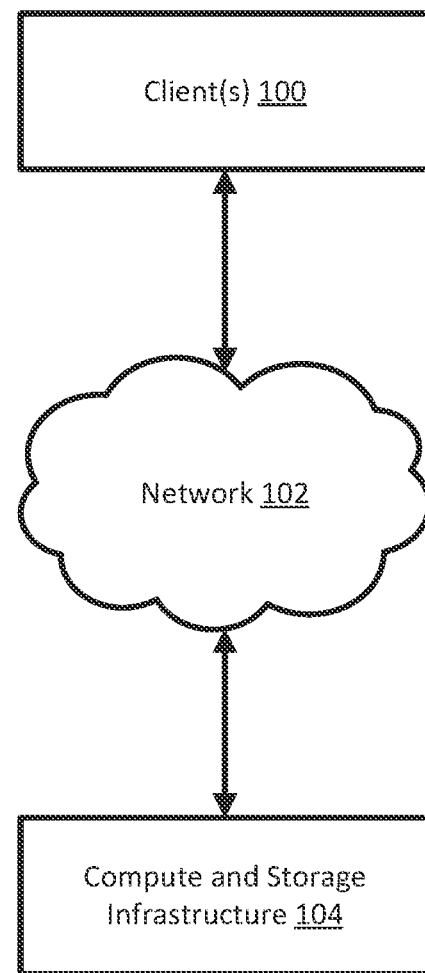
FIG. 1A shows a diagram of a system in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems, devices, and methods for implementing and leveraging memory devices (e.g., persistent memory (defined below) and NVMe devices (defined below) to improve performance of data requests (e.g., read and write requests). More specifically, various embodiments of the invention embodiments of the invention enable applications (e.g., applications in the application container in FIG. 2A) to issue data requests (e.g., requests to read and write data) to the operating system (OS). The OS receives such requests and processes them using an implementation of the portable operating system interface (POSIX). The client FS container may receive such requests via POSIX and subsequently process such requests. The processing of these requests includes interacting with metadata nodes (see e.g., FIG. 3) to obtain data layouts that provide a mapping between file offsets and scale out volume offsets (SOVs) (see e.g., FIGS. 5A-5B). Using the SOVs, the memory hypervisor module in the client FS container (see e.g., FIG. 2B) issues input/output (I/O) requests, via a fabric (also referred to as a communication fabric, described below), directly to the locations in the storage pool (110) (see e.g., FIG. 5B), bypassing the storage stack on the metadata nodes. Once the requested I/O is performed on the storage pool, a response is provided, via POSIX, to the application.

Using the aforementioned architecture, embodiments of the invention enable applications to interact with the memory devices at scale in a manner that is transparent to the applications. Said another way, the OS may continue to interact with the client FS container using POSIX and the client FS container, in turn, will provide a transparent mechanism to translate the requests received via POSIX into I/O requests that may be directly serviced by the storage pool.

FIG. 1A shows a diagram of a system in accordance with one or more embodiments of the invention. The system includes one or more clients (100), operatively connected to a network (102), which is operatively connected to one or more node(s) (not shown) in a compute and storage infrastructure (CSI) (104). The components illustrated in FIG. 1A may be connected via any number of operable connections supported by any combination of wired and/or wireless networks (e.g., network (102)). Each component of the system of FIG. 1A is discussed below.

In one embodiment of the invention, the one or more clients (100) are configured to issue requests to the node(s) in the CSI (104) (or to a specific node of the node(s)), to receive responses, and to generally interact with the various components of the nodes (described below).

In one or more embodiments of the invention, one or more clients (100) are implemented as computing devices. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one or more embodiments of the invention, the one or more clients (100) are implemented as a logical device. The logical device may utilize the computing resources of any number of computing devices and thereby provide the functionality of the one or more clients (100) described throughout this application.

In one or more embodiments of the invention, the one or more clients (100) may request data and/or send data to the node(s) in the CSI (104). Further, in one or more embodiments, the one or more clients (100) may initiate an application to execute on one or more client application nodes in the CSI (104) such that the application may, itself, gather, transmit, and/or otherwise manipulate data on the client application nodes, remote to the client(s). In one or more embodiments, one or more clients (100) may share access to the same one or more client application nodes in the CSI (104) and may similarly share any data located on those client application nodes in the CSI (104).

In one or more embodiments of the invention, network (102) of the system is a collection of connected network devices that allow for the communication of data from one network device to other network devices, or the sharing of resources among network devices. Examples of a network (e.g., network (102)) include, but are not limited to, a local area network (LAN), a wide area network (WAN) (e.g., the Internet), a mobile network, or any other type of network that allows for the communication of data and sharing of resources among network devices and/or devices (e.g., clients (100), node(s) in the CSI (104)) operatively connected to the network (102). In one embodiment of the invention, the one or more clients (100) are operatively connected to the node(s) (104) via a network (e.g., network (102)).

The CSI (104) includes one or more client application nodes, one or more metadata nodes, and zero, one or more storage nodes. Additional detail about the architecture of the CSI is provided below in FIG. 1B. Further, various embodiments of the node(s) (104) are provided in FIGS. 2A—FIG. 4 below.

While FIG. 1A shows a specific configuration of a system, other configurations may be used without departing from the scope of the disclosure. For example, although the one or more clients (100) and node(s) (104) are shown to be operatively connected through network (102), one or more clients (100) and node(s) (104) may be directly connected, without an intervening network (e.g., network (102)). Further, the functioning of the one or more clients (100) and the node(s) in the CSI (104) is not dependent upon the functioning and/or existence of the other device(s) (e.g., node(s) (104) and one or more clients (100), respectively). Rather, the one or more clients (100) and the node(s) in the CSI (104) may function independently and perform operations locally that do not require communication with other devices. Accordingly, embodiments disclosed herein should not be limited to the configuration of devices and/or components shown in FIG. 1A.

Figure 1B:
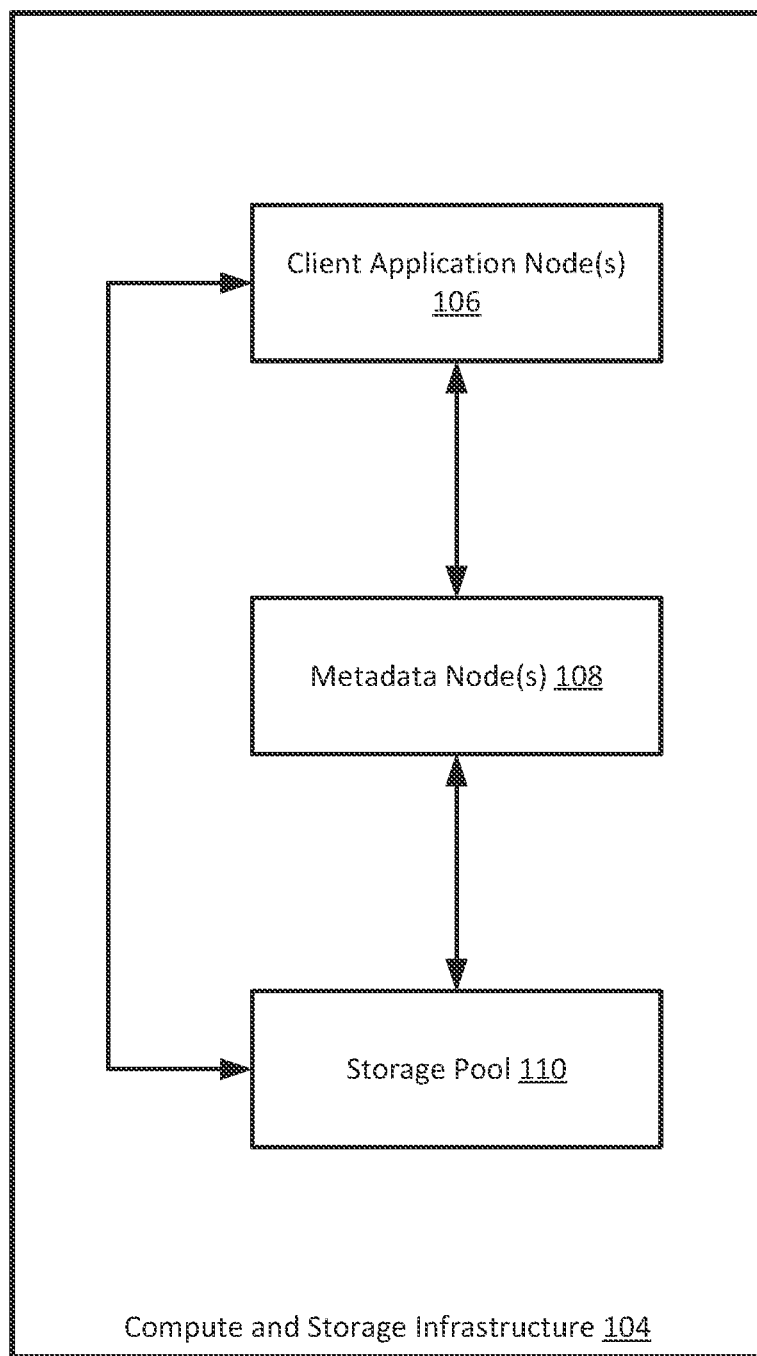
FIG. 1B shows a diagram of computer and storage infrastructure (CSI) in accordance with one or more embodiments of the invention.

FIG. 1B shows a diagram of computer and storage infrastructure (CSI) in accordance with one or more embodiments of the invention. As discussed above, the client application node(s) (106) executes applications and interacts with the metadata node(s) (108) to obtain, e.g., data layouts and other information (as described below) to enable the client application nodes to directly issue I/O requests to memory devices (or other storage media), which may be located on the client application nodes, the metadata nodes and/or the storage nodes, while bypassing the storage stack (e.g., the metadata server and the file system) on the metadata nodes. To that end, the client application nodes are able to directly communicate over a communication fabric(s) using various communication protocols, e.g., using Non-Volatile Memory Express (NVMe) over Fabric (NVMe-oF) and/or persistent memory over Fabric (PMEMoF), with the storage media in the storage pool (110) (see e.g., FIG. 5B).

Figure 2A:
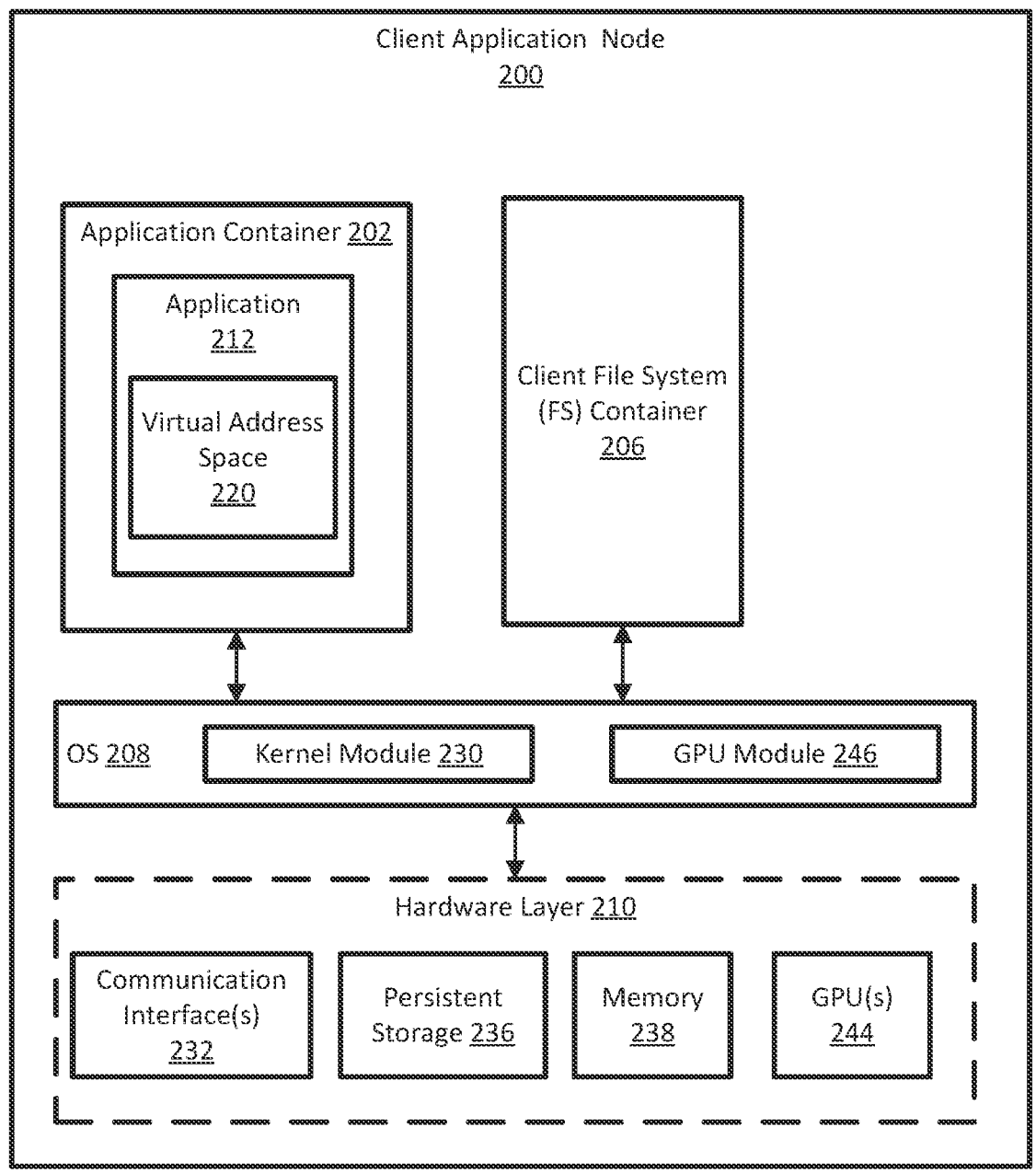
FIG. 2A shows a diagram of a client application node in accordance with one or more embodiments of the invention.
Figure 2B:
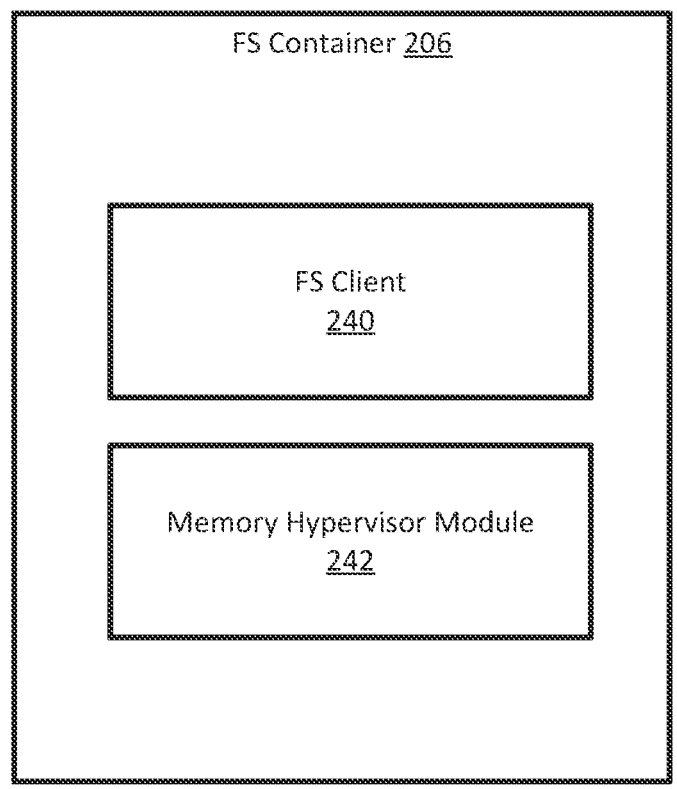
FIG. 2B shows a diagram of a client file system (FS) container in accordance with one or more embodiments of the invention.

FIGS. 2A-2B show diagrams of a client application node (200) in accordance with one or more embodiments of the invention. In one embodiment of the invention, client application node (200) includes one or more application container(s) (e.g., application container (202)), a client FS container (206), an operating system (OS) (208), and a hardware layer (210). Each of these components is described below. In one or more embodiments of the invention, the client application node (200) (or one or more components therein) is configured to perform all, or a portion, of the functionality described in FIGS. 6-7.

In one or more embodiments of the invention, an application container (202) is software executing on the client application node. The application container (202) may be an independent software instance that executes within a larger container management software instance (not shown) (e.g., Docker®, Kubernetes®). In embodiments in which the application container (202) is executing as an isolated software instance, the application container (202) may establish a semi-isolated virtual environment, inside the container, in which to execute one or more applications (e.g., application (212)).

In one embodiment of the invention, an application container (202) may be executing in "user space" (e.g., a layer of the software that utilizes low-level system components for the execution of applications) of the OS (208) of the client application node (200).

In one or more embodiments of the invention, an application container (202) includes one or more applications (e.g., application (212)). An application (212) is software executing within the application container (e.g., 202), that may include instructions which, when executed by a processor(s) (not shown) (in the hardware layer (210)), initiate the performance of one or more operations of components of the hardware layer (210). Although applications (212) are shown executing within application containers (202) of FIG. 2A, one or more applications (e.g., 212) may execute outside of an application container (e.g., 212). That is, in one or more embodiments, one or more applications (e.g., 212) may execute in a non-isolated instance, at the same level as the application container (202) or client FS container (206).

In one or more embodiments of the invention, each application (212) includes a virtual address space (e.g., virtual address space (220)). In one embodiment of the invention, a virtual address space (220) is a simulated range of addresses (e.g., identifiable locations) that mimics the physical locations of one or more components of the hardware layer (210). In one embodiment, an application (212) is not configured to identify the physical addresses of one or more components of the hardware layer (210); rather, the application (212) relies on other components of the client application node (200) to translate one or more virtual addresses of the virtual address space (e.g., 220) to one or more physical addresses of one or more components of the hardware layer (210). Accordingly, in one or more embodiments of the invention, an application may utilize a virtual address space (220) to read, write, and/or otherwise manipulate data, without being configured to directly identify the physical address of that data within the components of the hardware layer (210).

Figure 6:
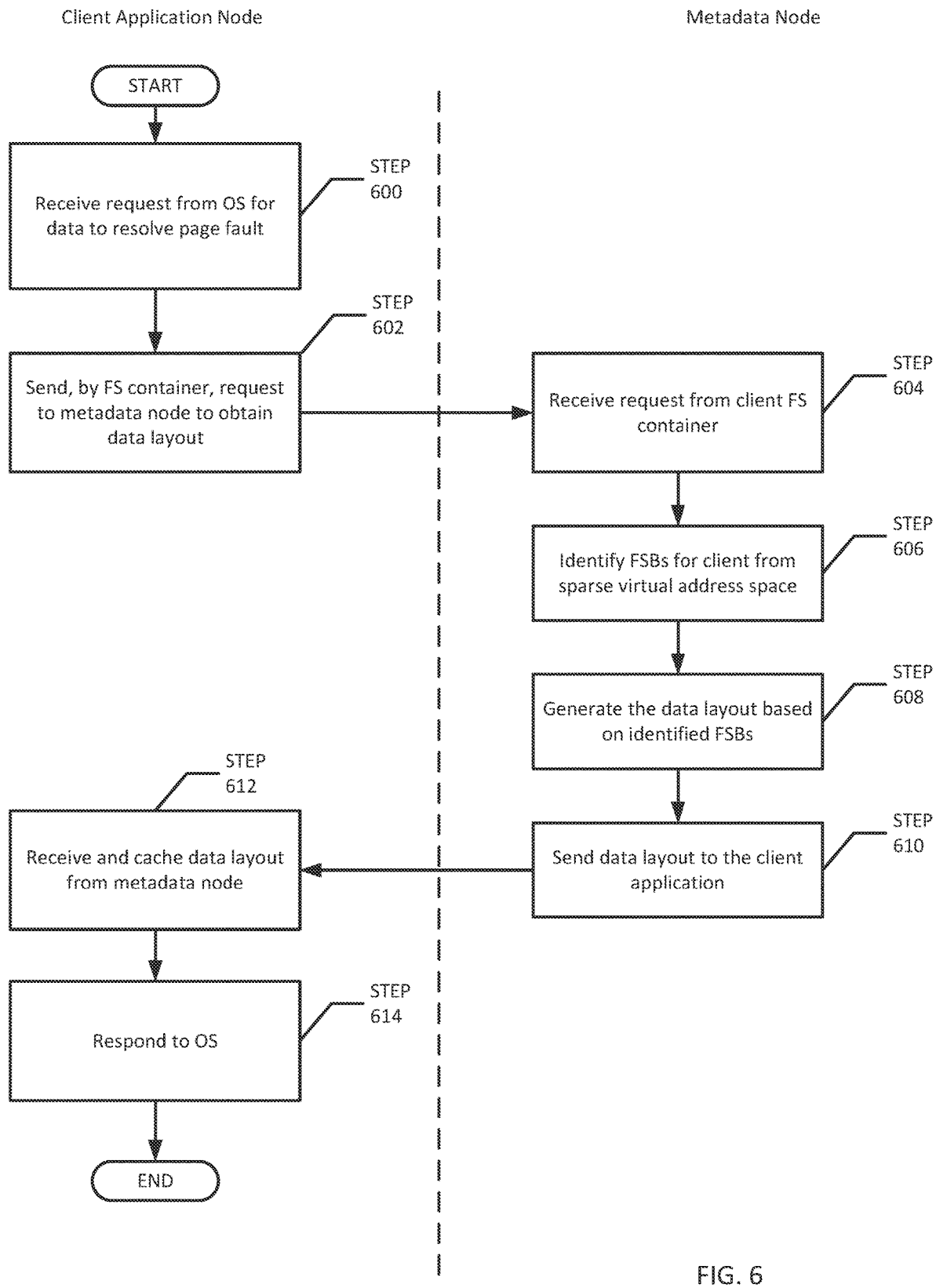
FIG. 6 shows a flowchart of a method of generating and servicing a mapping request in accordance with one or more embodiments of the invention.

Additionally, in one or more embodiments of the invention, an application may coordinate with other components of the client application node (200) to establish a mapping, see e.g., FIG. 6, between a virtual address space (e.g., 220) and underlying physical components of the hardware layer (210). In one embodiment, if a mapping is established, an application's use of the virtual address space (e.g., 220) enables the application to directly manipulate data in the hardware layer (210), without relying on other components of the client application node (200) to repeatedly update mappings between the virtual address space (e.g., 220) and the physical addresses of one or more components of the hardware layer (210). The above discussion with respect to the application's ability to interact with the hardware layer (210) is from the perspective of the application (212). However, as discussed below, the client FS container (206) (in conjunction with the metadata nodes) transparently enables to the application to ultimately read and write (or otherwise manipulate) data remoted and stored in the storage pool.

In one or more embodiments of the invention, a client FS container (206) is software executing on the client application node (200). A client FS container (206) may be an independent software instance that executes within a larger container management software instance (not shown) (e.g., Docker®, Kubernetes®, etc.). In embodiments in where the client FS container (206) is executing as an isolated software instance, the client FS container (206) may establish a semi-isolated virtual environment, inside the container, in which to execute an application (e.g., FS client (240) and memory hypervisor module (242), described below). In one embodiment of the invention, a client FS container (206) may be executing in "user space" (e.g., a layer of the software that utilizes low-level system components for the execution of applications) of the OS (208).

Referring to FIG. 2B, in one embodiment of the invention, the client FS container (206) includes an FS client (240) and a memory hypervisor module (242). In one embodiment, a FS client (240) is software executing within the client FS container (206). The FS client (204) is a local file system that includes functionality to interact with the OS using POSIX (i.e., using file semantics). Said another way, from the perspective of the OS, the FS client is the file system for the client application node and it is a POSIX file system. However, while the FS client interacts with the OS using POSIX, the FS client also includes functionality to interact with the metadata nodes and the memory hypervisor module using protocols other than POSIX (e.g., using memory semantics instead of file semantics).

In one or more embodiments of the invention, FS client (240) may include functionality to generate one or more virtual-to-physical address mappings by translating a virtual address of a virtual address space (220) to a physical address of a component in the hardware layer (210). Further, in one embodiment of the invention, the FS client (240) may further be configured to communicate one or more virtual-to-physical address mappings to one or more components of the hardware layer (210) (e.g., memory management unit (not shown)). In one embodiments of the invention, the FS client (240) tracks and maintains various mappings as described below in FIGS. 5A-5B. Additionally, in one or more embodiments of the invention, FS client (240) is configured to initiate the generation and issuance of I/O requests by the memory hypervisor module (242) (see e.g., FIGS. 6-7).

In one embodiment of the invention, the memory hypervisor module (242) is software executing within the client FS container (206) that includes functionality to generate and issue I/O requests over fabric directly to storage media in the storage pool. Additional detail about the operation of the memory hypervisor module is described below in FIGS. 6-7.

Returning to FIG. 2A, in one or more embodiments of the invention, an OS (208) is software executing on the client application node (200). In one embodiment of the invention, an OS (208) coordinates operations between software executing in "user space" (e.g., containers (202, 206), applications (212)) and one or more components of the hardware layer (210) to facilitate the proper use of those hardware layer (210) components. In one or more embodiments of the invention, the OS (208) includes a kernel module (230) and a GPU module (246). In one embodiment of the invention, the kernel module (230) is software executing in the OS (208) that monitors data (which may include read and write requests) traversing the OS (208) and may intercept, modify, and/or otherwise alter that data based on one or more conditions. In one embodiment of the invention, the kernel module (230) is capable of redirecting data received by the OS (208) by intercepting and modifying that data to specify a recipient different than normally specified by the OS (208).

In one embodiment of the invention, the GPU module (246) is software executing in the OS (208) that manages the mappings between the virtual address space and physical addresses in the GPU memory (not shown) that the GPU(s) (244) is using. Said another way, the application executing in the application container may be GPU-aware and, as such, store data directly within the GPU memory. The application may interact with the GPU memory using virtual addresses. The GPU module (246) maintains a mapping between the virtual addresses used by the application and the corresponding physical address of the data located in the GPU memory. In one embodiment of the invention, prior to the application using the GPU memory, the GPU module may register all or a portion of the GPU memory with the RDMA engine (which implements RDMA) within the external communication interface(s) (232). This registration allows the data stored within the registered portion of the GPU memory to be directly accessed by the RDMA engine and transferred to the storage nodes (see e.g., FIG. 2A). Because the GPU manages the memory allocated to the GPU, the client FS module needs to be able to interact with the GPU module in order for the memory hypervisor module to issue write requests to the storage nodes. In particular, while the memory hypervisor module obtains information related to the physical location(s) in the storage node(s) on which to write the data it needs the physical address(es) of data in the memory so that it can issue the appropriate write requests to store this data in the storage node(s). Without the physical addresses of the source data within the GPU memory, the memory hypervisor module does not have sufficient information to locate the data in the memory that is the subject of the write request.

In one or more embodiments of the invention, the hardware layer (210) is a collection of physical components configured to perform the operations of the client application node (200) and/or otherwise execute the software of the client application node (200) (e.g., those of the containers (202, 206), applications (e.g., 212)).

In one embodiment of the invention, the hardware layer (210) includes one or more communication interface(s) (232). In one embodiment of the invention, a communication interface (232) is a hardware component that provides capabilities to interface the client application node (200) with one or more devices (e.g., a client, another node in the CSI (104), etc.) and allow for the transmission and receipt of data (including metadata) with those device(s). A communication interface (232) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the communication interface (232) may implement and/or support one or more protocols to enable the communication between the client application nodes and external entities (e.g., other nodes in the CSI, one or more clients, etc.). For example, the communication interface (232) may enable the client application node to be operatively connected, via Ethernet, using a TCP/IP protocol to form a "network fabric" and enable the communication of data between the client application node and other external entities. In one or more embodiments of the invention, each node within the CSI may be given a unique identifier (e.g., an IP address) to be used when utilizing one or more protocols.

Further, in one embodiment of the invention, the communication interface (232), when using certain a protocol or variant thereof, supports streamlined access to storage media of other nodes in the CSI. For example, when utilizing remote direct memory access (RDMA) to access data on another node in the CSI, it may not be necessary to interact with the software (or storage stack) of that other node in the CSI. Rather, when using RDMA (via an RDMA engine (not shown) in the communications interface(s) (232)), it may be possible for the client application node to interact only with the hardware elements of the other node to retrieve and/or transmit data, thereby avoiding any higher-level processing by the software executing on that other node. In other embodiments of the invention, the communicate interface enables direct communication with the storage media of other nodes using Non-Volatile Memory Express (NVMe) over Fabric (NVMe-oF) and/or persistent memory over Fabric (PMEMoF) (both of which may (or may not) utilize all or a portion of the functionality provided by RDMA).

In one embodiment of the invention, the hardware layer (210) includes one or more processor(s) (not shown). In one embodiment of the invention, a processor may be an integrated circuit(s) for processing instructions (e.g., those of the containers (202, 206), applications (e.g., 212) and/or those received via a communication interface (232)). In one embodiment of the invention, processor(s) may be one or more processor cores or processor micro-cores. Further, in one or more embodiments of the invention, one or more processor(s) may include a cache (not shown) (as described).

In one or more embodiments of the invention, the hardware layer (210) includes persistent storage (236). In one embodiment of the invention, persistent storage (236) may be one or more hardware devices capable of storing digital information (e.g., data) in a non-transitory medium. Further, in one embodiment of the invention, when accessing persistent storage (236), other components of client application node (200) are capable of only reading and writing data in fixed-length data segments (e.g., "blocks") that are larger than the smallest units of data normally accessible (e.g., "bytes").

Specifically, in one or more embodiments of the invention, when data is read from persistent storage (236), all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage (236).

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage (236).

Examples of "persistent storage" (236) include, but are not limited to, certain integrated circuit storage devices (e.g., solid-state drive (SSD), magnetic storage (e.g., hard disk drive (HDD), floppy disk, tape, diskette, etc.), or optical media (e.g., compact disc (CD), digital versatile disc (DVD), NVMe devices, computational storage, etc.). In one embodiment of the invention, NVMe device is a persistent storage that includes SSD that is accessed using the NVMe® specification (which defines how applications communicate with SSD via a peripheral component interconnect express) bus. In one embodiment of the invention, computational storage is persistent storage that includes persistent storage media and microprocessors with domain-specific functionality to efficiently perform specific tasks on the data being stored in the storage device such as encryption and compression.

In one or more embodiments of the invention, the hardware layer (210) includes memory (238). In one embodiment of the invention, memory (238), similar to persistent storage (236), may be one or more hardware devices capable of storing digital information (e.g., data) in a non-transitory medium. However, unlike persistent storage (236), in one or more embodiments of the invention, when accessing memory (238), other components of client application node (200) are capable of reading and writing data at the smallest units of data normally accessible (e.g., "bytes").

Specifically, in one or more embodiments of the invention, memory (238) may include a unique physical address for each byte stored thereon, thereby enabling software (e.g., applications (212), containers (202, 206)) to access and manipulate data stored in memory (238) by directing commands to a physical address of memory (238) that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage, "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory (238).

Examples of memory (238) include, but are not limited to, certain integrated circuit storage (e.g., flash memory, random access memory (RAM), dynamic RAM (DRAM), resistive RAM (ReRAM), etc.) and Persistent Memory (PMEM). PMEM is a solid-state high-performance byte-addressable memory device that resides on the memory bus, where the location of the PMEM on the memory bus allows PMEM to have DRAM-like access to data, which means that it has nearly the same speed and latency of DRAM and the non-volatility of NAND flash.

In one embodiment of the invention, the hardware layer (210) includes a memory management unit (MMU) (not shown). In one or more embodiments of the invention, an MMU is hardware configured to translate virtual addresses (e.g., those of a virtual address space (220)) to physical addresses (e.g., those of memory (238)). In one embodiment of the invention, an MMU is operatively connected to memory (238) and is the sole path to access any memory device (e.g., memory (238)) as all commands and data destined for memory (238) must first traverse the MMU prior to accessing memory (238). In one or more embodiments of the invention, an MMU may be configured to handle memory protection (allowing only certain applications to access memory) and provide cache control and bus arbitration. Further, in one or more embodiments of the invention, an MMU may include a translation lookaside buffer (TLB) (as described below).

In one embodiment of the invention, the hardware layer (210) includes one or more graphics processing units (GPUs) (244). In one embodiment of the invention, the GPUs (244) are a type of processors that includes a significantly larger number of cores than the processors discussed above. The GPUs (244) may utilize the cores to perform a large number of processes in parallel. The processes performed by the GPUs may include basic arithmetic operations. The GPUs may perform additional types of processes without departing from the invention.

In one or more embodiments of the invention, the GPUs include computing resources that allow the GPUs to perform the functions described throughout this application. The computing resources may include cache, GPU memory (e.g., dynamic random access memory (DRAM)), and the cores discussed above. The cores may be capable of processing one or more threads at a time and temporarily storing data in the cache and/or local memory during the processing. A thread is a process performed on data by a core of the GPUs.

While FIGS. 2A-2B show a specific configuration of a client application node, other configurations may be used without departing from the scope of the disclosure. Accordingly, embodiments disclosed herein should not be limited to the configuration of devices and/or components shown in FIGS. 2A-2B.

Figure 3:
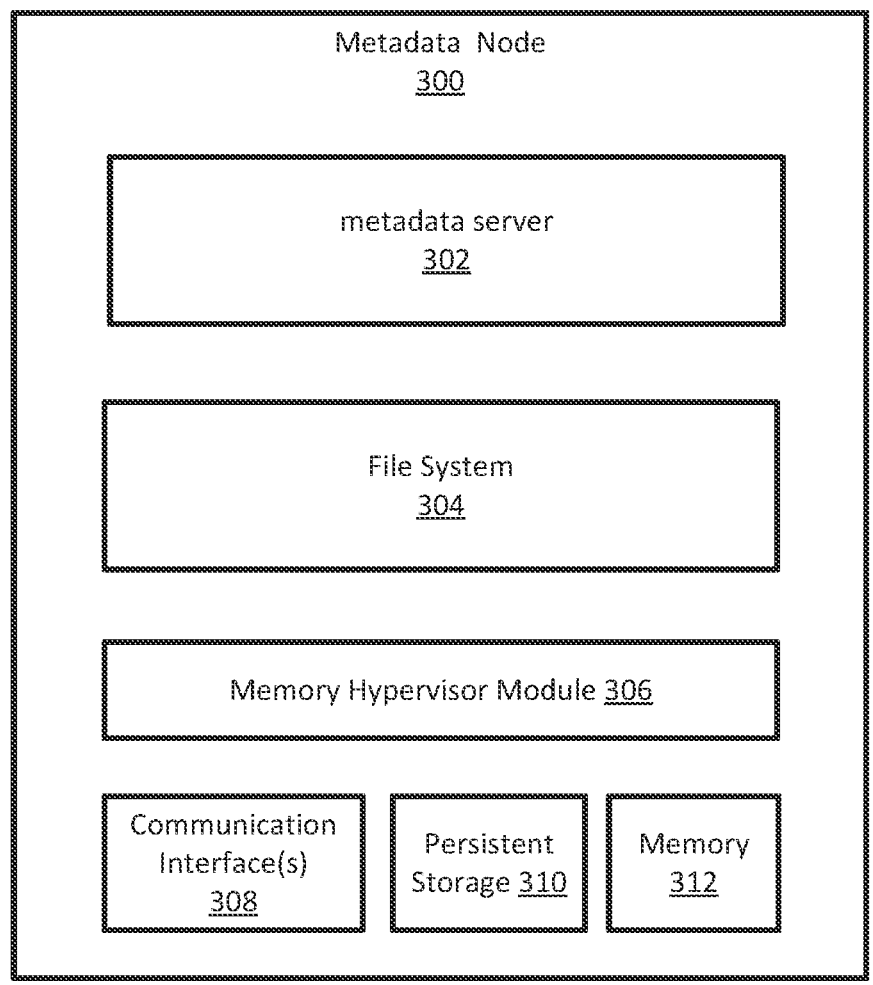
FIG. 3 shows an example of a metadata node in accordance with one or more embodiments of the invention.

FIG. 3 shows an example of a metadata node in accordance with one or more embodiments of the invention. In one embodiment of the invention, metadata node (300) includes a metadata server (302), a file system (304), a memory hypervisor module (306), an OS (not shown), a communication interface(s) (308), persistent storage (310), and memory (312). Each of these components is described below. In one or more embodiments of the invention, the metadata node (300) (or one or more components therein) is configured to perform all, or a portion, of the functionality described in FIGS. 6-7.

In one embodiment of the invention, the metadata server (302) includes functionality to manage all or a portion of the metadata associated with the CSI The metadata server (302) also includes functionality to service requests for data layouts that it receives from the various client application nodes. Said another way, each metadata node may support multiple client application nodes. As part of this support, the client application nodes may send data layout requests to the metadata node (300). Metadata node (300), in conjunction with the file system (304), generates and/or obtains the requested data layouts and provides the data layouts to the appropriate client application nodes. The data layouts provide a mapping between file offsets and [SOV, offset]s (see e.g., FIG. 5A-5B).

Figure 5A:
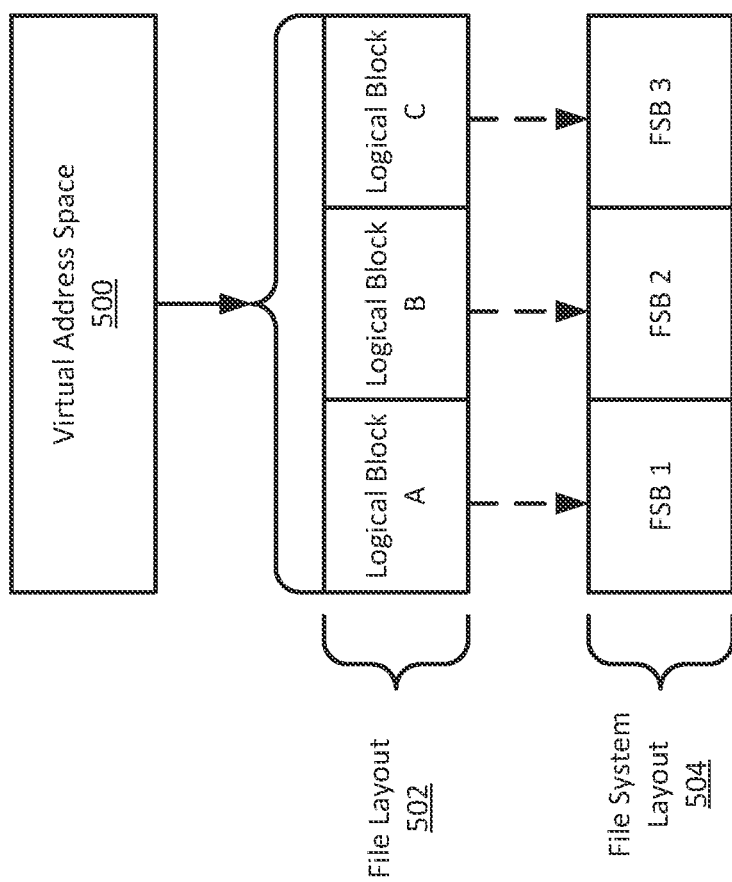
FIG. 5A shows relationships between various virtual elements in the system in accordance with one or more embodiments of the invention.
Figure 5B:
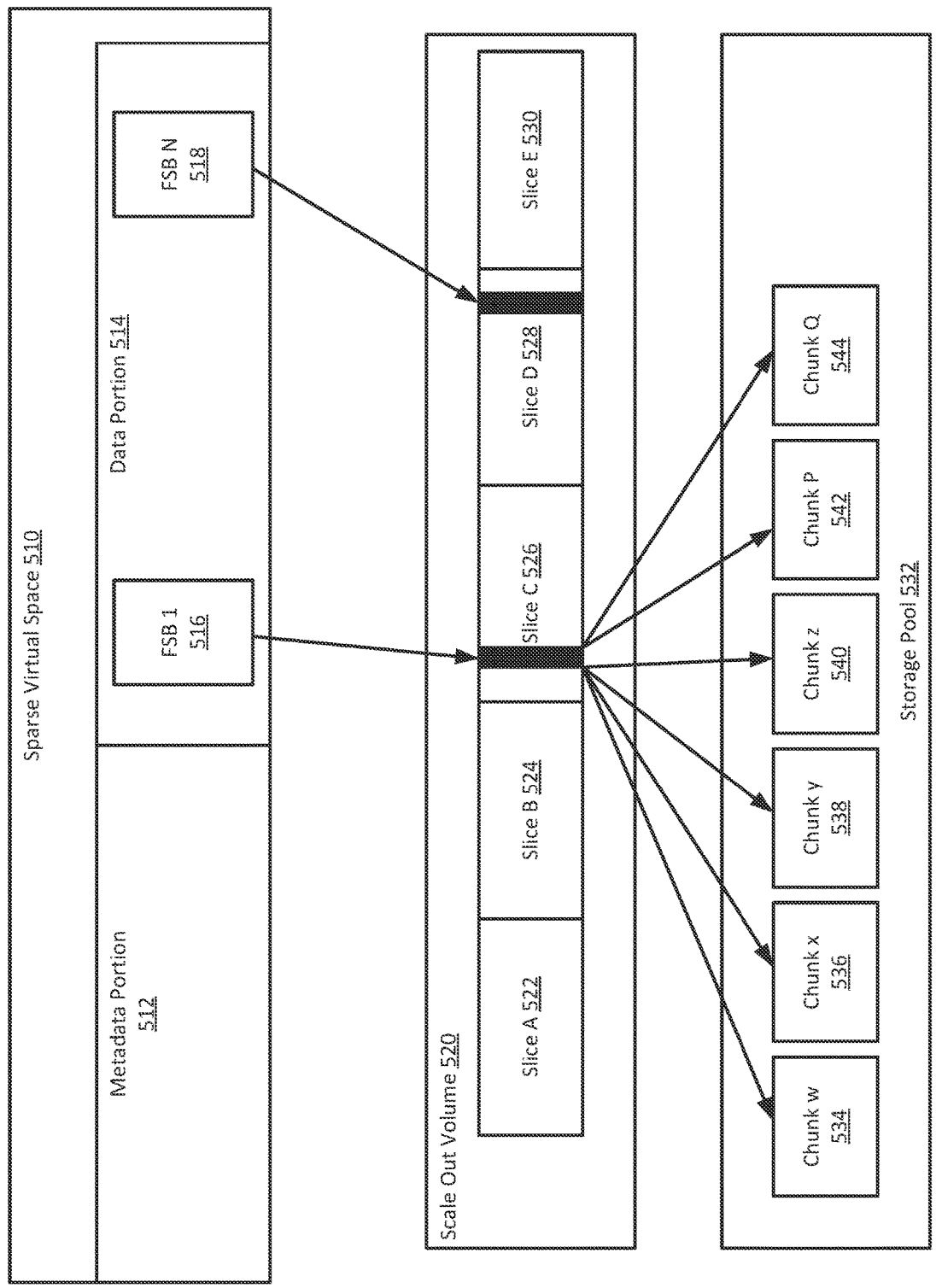
FIG. 5B shows relationships between various virtual and physical elements in the system in accordance with one or more embodiments of the invention.

In one embodiment of the invention, the file system (304) includes functionality to manage a sparse virtual space (see e.g., FIG. 5, 510) as well as the mapping between the sparse virtual space and an underlying SOV(s) (see e.g., FIG. 5, 520). The file system (304), the metadata server (302), or another component in the metadata node (300) manages the mappings between the SOV(s) and the underlying storage media in the storage pool. Additional detail about the sparse virtual space and the SOV(s) is provided below with respect to FIGS. 5A-5B.

In one embodiment of the invention, the memory hypervisor module (306) is substantially the same as the memory hypervisor module described in FIG. 2B (e.g., 242).

In one embodiment of the invention, the metadata node (300) includes one or more communication interfaces (308). The communication interfaces are substantially the same as the communication interfaces described in FIG. 2A (e.g., 232).

In one embodiment of the invention, metadata node (300) includes one or more processor(s) (not shown). In one embodiment of the invention, a processor may be an integrated circuit(s) for processing instructions (e.g., those of the metadata server (302), file system (304) and/or those received via a communication interface(s) (308)). In one embodiment of the invention, processor(s) may be one or more processor cores or processor micro-cores. Further, in one or more embodiments of the invention, one or more processor(s) may include a cache (not shown) (as described).

In one or more embodiments of the invention, the metadata node includes persistent storage (310), which is substantially the same as the persistent storage described in FIG. 2A (e.g., 236).

In one or more embodiments of the invention, the metadata node includes memory (312), which is substantially similar to memory described in FIG. 2A (e.g., 238).

Figure 4:
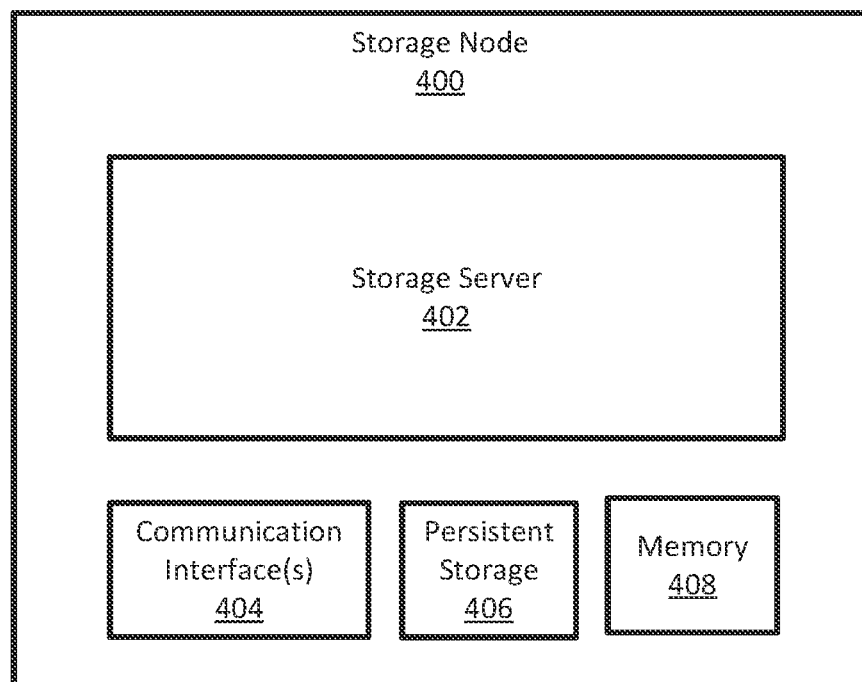
FIG. 4 shows an example of a storage node in accordance with one or more embodiments of the invention.

FIG. 4 shows an example of a storage node in accordance with one or more embodiments of the invention. In one embodiment of the invention, server node (400) includes a storage server (402), an OS (not shown), a communication interface(s) (404), persistent storage (406), and memory (408). Each of these components is described below. In one or more embodiments of the invention, the server node (400)

Figure 7:
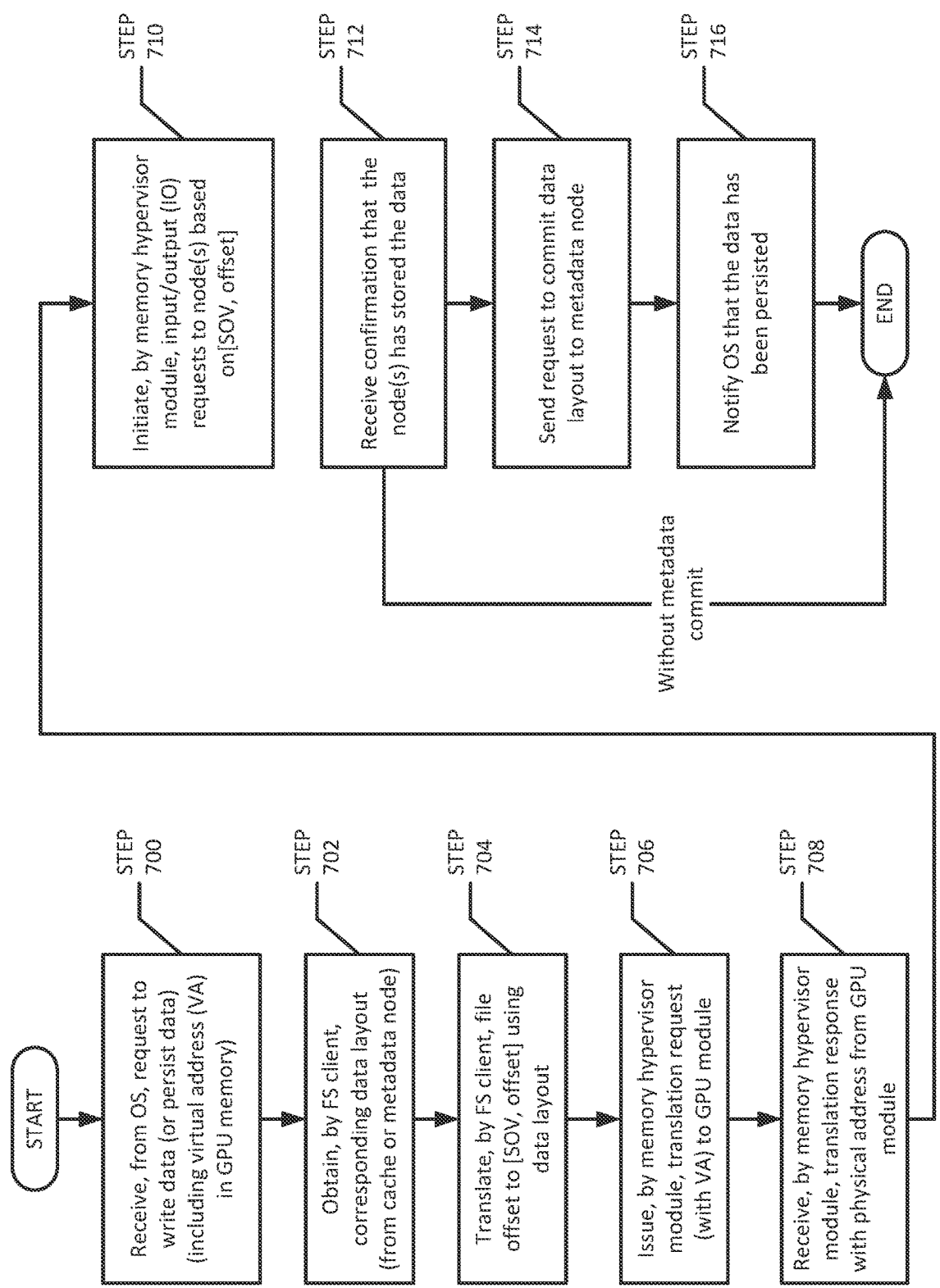
FIG. 7 shows a flowchart of a method of servicing a write request in accordance with one or more embodiments of the invention.

(or one or more components therein) is configured to perform all, or a portion, of the functionality described in FIGS. 6-7.

In one embodiment of the invention, the storage server (402) includes functionality to manage the memory (408) and persistent storage (406) within the storage node.

In one embodiment of the invention, the server node includes communication interface(s) (404), which is substantially the same as the memory communication interface(s) described in FIG. 2A (e.g., 232).

In one embodiment of the invention, server node (400) includes one or more processor(s) (not shown). In one embodiment of the invention, a processor may be an integrated circuit(s) for processing instructions (e.g., those of the storage server (402), and/or those received via a communication interface (404)). In one embodiment of the invention, processor(s) may be one or more processor cores or processor micro-cores. Further, in one or more embodiments of the invention, one or more processor(s) may include a cache (not shown) (as described).

In one or more embodiments of the invention, the server node includes persistent storage (406)), which is substantially the same as the persistent storage described in FIG. 2A (e.g., 236).

In one or more embodiments of the invention, the server node includes memory (408), which is substantially similar to memory described in FIG. 2A (e.g., 238).

FIGS. 5A-5B show relationships between various physical and virtual elements in the system in accordance with one or more embodiments of the invention. More specifically, FIGS. 5A-5B show the mappings that are maintained by the various nodes in the CSI in order to permit applications to read and/or write data in storage media in a storage pool.

Referring to FIG. 5A, applications (e.g., 212) executing in the application containers (e.g., 202) read and write from a virtual address space (500). The OS (e.g., 208) provides a mapping between offsets in the virtual address space (500) to corresponding logical blocks (e.g., logical block A, logical block B, logical block C) arranged in a file layout (502). Said another way, the OS maps segments of a virtual address space into a "file," where a virtual address space segment (i.e., a portion of the virtual address space) (not shown) is mapped to a file offset (i.e., an offset in a file defined by the file layout (502)).

When the OS (e.g., 208) interacts with the FS client (e.g., 240), it uses the file name (or file identifier) and offset to refer to a specific location from which the application (e.g., 212) is attempting to read or write. The FS client (e.g., 240) maps the logical blocks (e.g., logical block A, logical block B, logical block C) (which are specified using [file name, offset]) to corresponding file system blocks (FSBs) (e.g., FSB1, FSB2, FSB3). The FSBs that correspond to a given file layout (502) may be referred to as file system layout (504). In one embodiment of the invention, the file layout (502) typically includes a contiguous set of logical blocks, while the file system layout (504) typically includes a set of FSBs, which may or may not be contiguous FSBs. The mapping between the file layout (502) and the file system layout (504) is generated by the metadata server (see e.g., FIGS. 6-7).

Referring to FIG. 5B, the FSBs (e.g., FSB 1 (516), FSB N (518)) correspond to FSBs in a sparse virtual space (510). In one embodiment of the invention, the sparse virtual space (510) is a sparse, virtual data structure that provides a comprehensive layout and mapping of data managed by the file system (e.g., FIG. 3, 304) in the metadata node. Thus, while there may be multiple virtual address space(s) (e.g., virtual address space (500)) and there may be multiple SOVs (520) there is only one sparse virtual space (510).

In one embodiment of the invention, the sparse virtual space (510) may be allocated with several petabytes of sparse space, with the intention being that the aggregate space of the storage media in the storage pool (532) will not exceed several petabytes of physical storage space. Said another way, the sparse virtual space (510) is sized to support an arbitrary number of virtual address spaces and an arbitrary amount of storage media such that the size of the sparse virtual space (510) remains constant after it has been initialized.

The sparse virtual space (510) may be logically divided into a metadata portion (512) and a data portion (514). The metadata portion (512) is allocated for the storage of file system metadata and FS client metadata. The file system metadata and the FS client metadata may correspond to any metadata (examples of which are provided below with respect to FIGS. 6-7) to enable (or that enables) the file system and the FS client to implement one or more embodiments of the invention. The data portion (514) is allocated for the storage of data that is generated by applications (e.g., 212) executing on the client application nodes (e.g., 200). Each of the aforementioned portions may include any number of FSBs (e.g., 516, 518).

In one or more embodiments of the invention, each FSB may be uniformly sized throughout the sparse virtual space (510). In one or more embodiments of the invention, each FSB may be equal to the largest unit of storage in storage media in the storage pool. Alternatively, in one or more embodiments of the invention, each FSB may be allocated to be sufficiently larger than any current and future unit of storage in storage media in the storage pool.

In one or more embodiments of the invention, one or more SOVs (e.g., 520) are mapped to FSBs in the sparse virtual space (510) to ultimately link the FSBs to storage media. More specifically, each SOV is a virtual data space that is mapped to corresponding physical regions of a portion of, one, or several storage devices, which may include one or more memory devices and one or more persistent storage devices. The SOV(s) (e.g., 520) may identify physical regions of the aforementioned devices by maintaining a virtual mapping to the physical addresses of data that comprise those memory devices (e.g., 238, 312, 408) or persistent storage devices (e.g., 236, 310, 406).

In one or more embodiments of the invention, several SOVs may concurrently exist (see e.g., FIG. 15A), each of which is independently mapped to part of, one, or several memory devices. Alternatively, in one embodiment of the invention, there may only be a SOV associated with the physical regions of all devices in a given node (e.g., a client application node, a metadata node, or a storage node).

In one embodiment of the invention, a SOV may be uniquely associated with a single storage device (e.g., a memory device or a persistent storage device). Accordingly, a single SOV may provide a one-to-one virtual emulation of a single storage device of the hardware layer. Alternatively, in one or more embodiments of the invention, a single SOV may be associated with multiple storage devices (e.g., a memory device or a persistent storage device), each sharing some characteristic. For example, there may be a single SOV for two or more DRAM devices and a second memory pool for two or more PMEM devices. One of ordinary skill in the art, having the benefit of this detailed description, would appreciate that SOV(s) (e.g., 520) may be organized by any suitable characteristic of the underlying memory (e.g., based on individual size, collective size, type, speed, etc.).

In one embodiment of the invention, storage pool (532) includes one or more storage devices (e.g., memory devices and/or persistent storage devices). The storage devices (or portions thereof) may be mapped into the SOV in "slice" units (or "slices"). For example, each slice (e.g., 522, 524, 526, 528, 530) may have a size of 256 MB (the invention is not limited to this example). When mapped into the SOV, each slice may include a contiguous set of FSBs that have an aggregate size equal to the size of the slice. Accordingly, each of the aforementioned FSBs (e.g., 516, 518) is logically associated with a slice (e.g., 522, 524, 526, 528, 530) in the SOV. The portion of the slice that is mapped to a given FSB may be specified using by an offset within a SOV (or by an offset within a slice within the SOV). Each portion of the slice within a SOV is mapped to one or more physical locations in the storage pool. In one non-limiting example, the portion of client C (256) may be 4K in size and may be stored in the storage pool (532) as a 6K stripe with four 1K data chunks (e.g., chunk w (534), chunk x (536), chunky (538), chunk z (540)) and two 1K parity chunks (e.g., chunk P (542), chunk Q (544)). In one embodiment of the invention, slices that only include FSBs from the metadata portion are referred to as metadata slices and slices that only include FSBs from the data portion are referred to as data slices.

Using the relationships shown in FIGS. 5A-5B, a logical block (e.g., logical block A, logical block B, logical block C) in a file layout (502) (which may be specified as a [file, offset, length]) is mapped to an FSB (e.g., 516, 518), the FSB (e.g., 516, 518) is mapped to a location in the SOV (520) (which may be specified as a [SOV, offset, length]), and the location in the SOV (520) is ultimately mapped to one or more physical locations (e.g., 534, 536, 538, 540, 542, 544) in a storage media (e.g., memory devices) within a storage pool (532).

Using the aforementioned architecture, the available storage media in the storage pool may increase or decrease in size (as needed) without impacting how the application (e.g., 212) is interacting with the sparse virtual space (510). More specifically, by creating a layer of abstraction between the sparse virtual space (510) and the storage pool (532) using the SOV (520), the sparse virtual space (510) continues to provide FSBs to the applications provided that these FSBs are mapped to a SOV without having to manage the mappings to the underlying storage pool. Further, by utilizing the SOV (520), changes made to the storage pool including how data is protected in the storage pool are performed in a manner that is transparent to the sparse virtual space (510). This enables the size of the storage pool to scale to an arbitrary size (up to the size limit of the sparse virtual space) without modifying the operation of the sparse virtual space (510).

FIG. 6 shows a flowchart of a method of generating and servicing a mapping request in accordance with one or more embodiments of the invention. All or a portion of the method shown in FIG. 6 may be performed by the client application node and/or the metadata node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 6 may be performed whenever an application (212) in a client application container (e.g., 202) triggers a page fault. In one embodiment of the invention, a page fault is issued by a processor when an invalid reference is provided to an MMU. Specifically, when a request (initiated by the application) to access or modify memory is sent to the MMU, using a virtual address, the MMU may perform a lookup in a TLB to find a physical address associated with the provided virtual address (e.g., a virtual-to-physical address mapping). However, if the TLB does not provide a physical address associated with the virtual address (e.g., due to the TLB lacking the appropriate virtual-to-physical address mapping), the MMU will be unable to perform the requested operation. Accordingly, the MMU informs the processor that the request cannot be serviced, and in turn, the processor issues a page fault back to the OS informing that the request could not be serviced.

A page fault typically specifies the virtual address (i.e., an address in virtual address space (e.g. 220)). The page fault may specify other information depending on whether the page fault was triggered by a read, write, or mapping request.

In one or more embodiments of the invention, as described in FIG. 2A above, the kernel module is software executing in the OS that monitors data traversing the OS and may intercept, modify, and/or otherwise alter that data based on one or more conditions. In one embodiment of the invention, the kernel module is capable of redirecting data received by the OS by intercepting and modifying that data to specify a recipient different than normally specified by the OS.

In one or more embodiments of the invention, the OS will, initially, be configured to forward the page fault to the application from which the request originated. However, in one embodiment of the invention, the kernel module detects that the OS received a page fault, and instead forwards the page fault to a different location (i.e., the client FS container) instead of the default recipient (i.e., the application container and/or application). In one embodiment of the invention, the kernel module specifically monitors for and detects exception handling processes that specify an application's inability to access the physical location of data.

Turning to FIG. 6, in step 600, the client FS container receives a request from a kernel module to resolve a page fault, where the request specifies at least one [file, offset] corresponding to the virtual address from the virtual address space of the application. Said another way, the virtual address associated with the page fault is translated into a [file, offset]. The [file, offset] is then sent to the client FS container.

In step 602, the FS container sends a request to a metadata node to obtain a data layout associated with the [file, offset]. The request for the data layout may also specify that the request is for read only access or for read write access. In one embodiment of the invention, read only access indicates that the application only wants to read data from a physical location associated with the virtual address while read write access indicates that the application wants to read data from and/or write data to a physical location associated with the virtual address. From the perspective of the application, the physical location is a local physical location (i.e., a physical location in the memory or the persistent storage) on the client application node; however, as shown in FIGS. 5A-5B, the physical location is actually a physical location in the storage pool.

In one embodiment of the invention, each FS client (e.g., 240) is associated with a single file system (e.g., 304) (however, each file system may be associated with multiple FS clients). The request in step 602 is sent to the metadata node that hosts the file system that is associated with the FS client on the client application node (i.e., the client application node on which the page fault was generated).

In step 604, the metadata node receives the request from the FS client container.

In step 606, in response to the request, the metadata server (on the metadata node) identifies one or more FSBs in the sparse virtual space. The identified FSBs correspond to FSB that are allocatable. An FSB is deemed allocatable if: (i) the FSB is mapped to the SOV and (ii) the FSB has not already been allocated. Condition (i) is required because while the sparse virtual space includes a large collection of FSBs, by design, at any given time not all of these FSBs are necessarily associated with any SOV(s). Accordingly, only FSBs that are associated with a SOV at the time step 606 is perform may be allocated. Condition (ii) is required as the sparse virtual space is designed to support applications distributed across multiple clients and, as such, one or more FSBs that are available for allocation may have been previously allocated by another application. The FSBs identified in step 606 may be denoted a pre-allocated FSBs in the event that no application has not written any data to these FSBs.

In one embodiment of the invention, the FSBs identified in step 606 may not be sequential (or contiguous) FSBs in the sparse virtual space. In one or more embodiments of the invention, more than one FSB may be allocated (or pre-allocated) for each logical block. For example, consider a scenario in which each logical block is 8K and each FSB is 4K. In this scenario, two FSBs are allocated (or pre-allocated) for each logical block. The FSBs that are associated with the same logical block may be sequential (or contiguous) FSBs within the sparse virtual space.

In step 608, after the FSB(s) has been allocated (or pre-allocated as the case may be), the metadata server generates a data layout. The data layout provides a mapping between the [file, file offset] (which was included in the request received in step 600) and a [SOV, offset]. The data layout may include one or more of the aforementioned mappings between [file, file offset] and [SOV, offset]. Further, the data layout may also specify the one or more FSBs associated with the data layout.

In one embodiment of the invention, if the request in step 602 specifies read only access, then the data layout will include [file, file offset] to [SOV, offset] mappings for the FSBs that include the data that the application (in the client application node) is attempting to read. In one embodiment of the invention, if the request in step 602 specifies read write access, then then the data layout may include one set of [file, file offset] to [SOV, offset] mappings for the FSBs that include the data that the application (in the client application node) is attempting to read and a second set of [file, file offset] to [SOV, offset] mappings for the FSBs to which the application may write data. The dual set of mappings provided in the aforementioned data layout may be used to support redirected writes, i.e., the application does not overwrite data; rather, all new writes are directed to new FSBs.

Continuing with the discussion of FIG. 6, in step 610, the data layout is sent to the FS client container. The metadata server may track which client application nodes have requested which data layouts. Further, if the request received in step 600 specified read write access, the metadata server may prevent any other client application from accessing the FSBs associated with the data layout generated in Step 608.

In step 612, the client application node receives and caches the data layout from the metadata node. The FS client may also create an association between the logical blocks in the file layout (e.g., 502) and the corresponding FSBs in the file system layout (e.g., 504) based on the data layout.

In one embodiment of the invention, the FS client allocates an appropriate amount of local memory (e.g., local DRAM, local PMEM), which is/will be used to temporarily store data prior to it being committed to (i.e., stored in) the storage pool using the received data layout. Further, if the request that triggered the page fault (see step 600) was a read request, then the FS client may further initiate the reading of the requested data from the appropriate location(s) in the storage pool (e.g., via the memory hypervisor module) and store the obtained data in the aforementioned local memory.

In step 614, the client FS container informs the OS (or kernel module in the OS) of the virtual-to-physical address mapping. The virtual-to-physical address mapping is a mapping of a location in the virtual address space and a physical address in the local memory (as allocated in step 612). Once the aforementioned mapping is provided, the application and/or OS may directly manipulate the local memory of the client application node (i.e., without processing from the client FS container).

While FIG. 6 describes the allocation of local memory (e.g., 238), in scenarios in which the application is GPU-aware (i.e., the application is interacting with the GPU memory of the GPU (e.g., 244), the virtual addresses used in virtual-to-physical address mapping is a mapping of a location in the virtual address space and a physical address in the GPU memory. The allocation of the GPU memory is managed by the GPU module (246) in the OS (208). In addition to managing the virtual-to-physical address mapping for the GPU memory, the GPU module also registers the physical address specified in the virtual-to-physical address mapping with the RDMA engine (i.e., the RDMA engine on the client application node). The registration allows the RDMA engine to directly access the data in the GPU memory and transmit it to the appropriate storage node(s) via the communication fabric.

FIG. 7 shows a flowchart of a method of servicing a write request in accordance with one or more embodiments of the invention. All or a portion of the method shown in FIG. 7 may be performed by the client application node. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

The method shown in FIG. 7 may be performed whenever an application in the application (e.g., 212) wants to write data. More specifically, once the method shown in FIG. 6 has been performed, the application may directly read and write data to the GPU memory of a client application node, which is then written via steps 700-708 to the storage pool. Further, for the data to be persisted the data must be stored in both the storage pool and the corresponding metadata must be stored in the metadata node (see e.g., Step 710-712). Steps 700-708, which relate to the storage of the data in the storage pool, may be initiated by the client application, the OS, or the client FS container. The client application may initiate the storage of the data as part of an msync or fflush command; while the OS and client FS container may initiate the storage of the data as part of its management of the local resources on the client application node.

If the application has initiated the storage of the data using a msync or fflush command, then steps 700-712 are performed, resulting the data being persisted. In this scenario, the data is written to storage as a first part of processing the msync or fflush command, and then the metadata (including the data layout) is stored on the metadata server as the second part of processing the msync or fflush command.

However, if the OS or client FS container initiates the storage of the data, then the corresponding metadata may or may not be committed (i.e., steps 710 and 712 may not be performed). In certain scenarios, steps 710-712 may be initiated by the OS or the client FS container and performed by the client FS container as part of the OS or client FS container managing the local resources (e.g., portions of the cache used to store the data layouts needs to be freed to store other data layouts).

In step 700, a request to write data (i.e., write data to the storage pool; however, the metadata may or may not be committed, see e.g., Step 710) is received by the client FS container from the OS. The request may specify a virtual address corresponding to the location of the data in GPU memory and a [file, offset]. As discussed above the writing of data may also be initiated by the OS and/or the client FS container without departing from the invention. In such embodiments, the request is initiated by the OS and/or another process in the client FS container and the process that initiated the request provides the [file, offset] to the FS client.

In step 702, the FS client obtains the data layout required to service the request. The data layout may be obtained using the [file, offset] in the request received from the OS. The data layout may be obtained from a cache on the client application node. However, if the data layout is not present on the client application node, e.g., because it was invalidated and, thus, removed from the client application node, then the data layout is obtained from the metadata node in accordance with FIG. 6, steps 602-612.

In step 704, the FS client, using the data layout, obtains the SOV offset. As discussed above, the data layout provides a mapping between file offsets (e.g., offsets within a file layout (e.g., 502)) and the [SOV, offset] s in a SOV (e.g., 520). Accordingly, the FS client translates the [file, offset] into [SOV, offset].

In step 706, the memory hypervisor module issues a translation request to the GPU module, where the translation request specifies the virtual address (i.e., the virtual address specified in the write request in step 700).

In step 708, the memory hypervisor module receives a translation response from the GPU module that includes a physical address in the GPU memory, which corresponds to the virtual address. The GPU module is configured to receive the translation request, perform a look-up in the virtual-to-physical address mapping, and provides the resulting physical address in the translation response.

In step 710, the [SOV, offset] is then provided to the memory hypervisor module to process. More specifically, the memory hypervisor module includes the information necessary to generate and issue one or more I/O requests that result in the data being written directly from the GPU memory on the client application node (e.g., via a communication interface(s)) to an appropriate location in storage pool. For example, if the application is attempting to write data associated with logical block A (e.g., [File A, offset 0], then the memory hypervisor module is provided with [SOV, offset 18] (which is determined using the obtained data layout). The memory hypervisor module includes the necessary information to enable it to generate, in this example, one or more I/O requests to specific locations in the storage pool. Said another way, the memory hypervisor module includes functionality to: (i) determine how many I/O requests to generate to store the data associated with [SOV, offset 18]; (ii) divide the data into an appropriate number of chunks (i.e., one chunk per I/O request); (iii) determine the target of each I/O request (the physical location in the storage pool at which the chunk will be stored); and (iv) issue the I/O requests directly to the nodes on which the aforementioned physical locations exist. The issuance of the I/O requests includes initiating the transfer of data from the appropriate location in the GPU memory to the target location specified in the I/O request.

The communication interface(s) in the client application node facilitates the direct transfer of the data from the client application node to the appropriate location in the storage pool. As discussed above, the storage pool may include storage media located in storage devices (e.g., memory devices or persistent storage devices) that may be on client application nodes, metadata nodes, and/or storages. Accordingly, for any given I/O request, the communication interface(s) on the client application node on which the data resides transmits the data directly to communication interface(s) of the target node (i.e., the node that includes the storage media on which the data is to be written).

In step 712, the client application node awaits for confirmation from the target node(s) that the I/O request(s) generated and issued in step 710 has been successfully stored on the target node(s). At the end of step 712, the data has been written to the storage pool; however, the corresponding metadata is not persisted at this point; as such, the data is not deemed to be persisted. Specifically, if the application does not subsequently issue an msync command (e.g., when the application is using memory semantics) or an fflush command (e.g., when the application is using file semantics) the data will be stored in the storage pool but the metadata server will not be aware that such data has been stored. In order to persist the data, steps 714 and 716 are performed. If steps 700-710 were initiated by the OS or the client FS container, then the process may end at step 712 as the data was only written to the storage pool to free local resources (e.g., memory) on the client application node and there is no need at this time to persist the data (i.e., perform steps 714-716). Further, in scenarios in which the OS initiated the writing of the data, then step 712 also includes the client FS container notifying the OS that that the data has been written to the storage pool. However, as discussed below, there may be scenarios in which the data needs to be persisted at this time and, as such, steps 714-716 are performed.

Specifically, the data (and associated metadata) may be persisted as a result of: (i) the application issuing an msync command (e.g., when the application is using memory semantics) or an fflush command (e.g., when the application is using file semantics, (ii) the client FS container initiating (transparently to the application) steps 714 and 716, or (iii) the OS initiating (transparently to the application) steps 714 and 716.

If the application issues a request to commit data (e.g., issues an msync command or an fflush command), then in step 714, the client application node (in response to the confirmation in step 712) sends a request to commit the data layout to the metadata node. The commit request includes the mapping between the file layout and the file system layout (see e.g., FIG. 5A). Upon receipt of the commit request, the metadata server stores the mapping between the file layout and the file system layout. The processing of the commit request may also trigger the invalidation of prior versions of the data layout that are currently cached on other client application nodes. For example, if client application node A requested a data layout with read only access for a [file, offset] corresponding to FSB A and client application node B subsequently requested a data layout with read write access also for FSB A, then once client application node B performs the method in FIG. 7, the data layout on client application node A is invalidated (e.g., based on a command issued by the metadata server) so as to force client application node A to obtain an updated data layout, which then ensures that client application node A is reading the updated version of the data associated with FSB A. The process then proceeds to step 716.

In scenarios in which the OS or client FS container has previously committed the data layout to the metadata node, then when the client FS container receives a request to persist the data from the application, the client FS container confirms that it has previously committed the corresponding data layout (and other related metadata) (without issuing any request to the metadata nodes). After making this determination locally, the client FS container then proceeds to step 716.

Finally, in scenarios in which the OS or the client FS container needs to commit the corresponding metadata to the metadata server (e.g., portions of the cache used to store the data layouts needs to be freed to store other data layouts), then steps 714 and 716 may be initiated by the OS or the client FS container and performed by the client FS container.

In step 716, the client FS container then notifies the OS that the data has been persisted. The OS may then send the appropriate confirmation and/or notification to the application that initiated the request to persist the data. The OS does not notify the application when FIG. 7 was initiated by the OS and/or the client FS container. Further, depending on the implementation, the client FS container may or may not notify the OS if steps 714 and 716 were initiated by the client FS container.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:

1. A method for storing data, the method comprising:
   receiving, from an operating system (OS) and by a client file system (FS) container both executing on a client application node, a request to write data to a storage pool operatively connected to the client application node,
      wherein the client FS container comprises a memory hypervisor module;
   generating, by the memory hypervisor module,
      at least one input/output (I/O) request,
         wherein the at least one I/O request specifies a location in the storage pool and a physical address of the data in a graphics processing unit (GPU) memory in a GPU on the client application node,
         wherein the location is determined using a data layout,
         wherein the data layout provides a mapping between a [file, offset] and a [scale out volume (SOV), offset] and the SOV is associated with the storage pool,
         wherein the SOV provides a layer of abstraction between a sparse virtual space associated with the client application node and storage devices of the storage pool,
         wherein the storage devices are scalable in size without impacting interaction between the SOV and the client application node, and
         wherein the physical address is determined using a GPU module; and
   issuing, by the memory hypervisor module, the at least one I/O request to the storage pool,
      wherein processing the at least one I/O request results in at least a portion of the data being stored at the location, and
      wherein a commit of a data layout based on the I/O request is sent to a metadata node operatively connected to the client application node and the storage pool, and a previous data layout associated with the client application node on the metadata node is invalidated.

2. The method of claim 1,
   wherein the data is associated with a [file, offset] and a virtual address of the sparse virtual space,
   wherein the GPU module provides a mapping between the virtual address and the physical address.

3. The method of claim 2, wherein the request to write data to the storage pool is initiated by an application executing on the client application node, wherein the application is a GPU-aware application.

4. The method of claim 3, wherein the GPU module registers the physical address with a remote direct memory access (RDMA) engine on the client application node prior the application issuing the request to write data.

5. The method of claim 1, wherein processing the at least one I/O request comprises issuing data directly from the GPU memory to a communication fabric using a remote direct memory access (RDMA) engine on the client application node, wherein the communication fabric operatively connects the client application node to the storage pool.

6. The method of claim 1, wherein the location in the storage pool is a location in a memory device and wherein the memory device is a persistent memory (PMEM) device.

7. The method of claim 1, wherein the GPU module executes in an operating system (OS) of the client application node.

8. A non-transitory computer readable medium comprising instructions which, when executed by a processor, enable the processor to perform a method for storing data, the method comprising:
   receiving, from an operating system (OS) and by a client file system (FS) container both executing on a client application node, a request to write data to a storage pool operatively connected to the client application node,
      wherein the client FS container comprises a memory hypervisor module;
   generating, by the memory hypervisor module,
      at least one input/output (I/O) request,
         wherein the at least one I/O request specifies a location in the storage pool and a physical address of the data in a graphics processing unit (GPU) memory in a GPU on the client application node,
         wherein the location is determined using a data layout,
         wherein the data layout provides a mapping between a [file, offset] and a [scale out volume (SOV), offset] and the SOV is associated with the storage pool,
         wherein the SOV provides a layer of abstraction between a sparse virtual space associated with the client application node and storage devices of the storage pool, wherein the storage devices are scalable in size without impacting interaction between the SOV and the client application node, and wherein the physical address is determined using a GPU module; and issuing, by the memory hypervisor module, the at least one I/O request to the storage pool, wherein processing the at least one I/O request results in at least a portion of the data being stored at the location, and wherein a commit of a data layout based on the I/O request is sent to a metadata node operatively connected to the client application node and the storage pool, and a previous data layout associated with the client application node on the metadata node is invalidated.

9. The non-transitory computer readable medium of claim 8, wherein the data is associated with a [file, offset] and a virtual address, wherein the GPU module provides a mapping between the virtual address and the physical address.

10. The non-transitory computer readable medium of claim 9, wherein the request to write data to the storage pool is initiated by an application executing on the client application node, wherein the application is a GPU-aware application.

11. The non-transitory computer readable medium of claim 10, wherein the GPU module registers the physical address with a remote direct memory access (RDMA) engine on the client application node prior the application issuing the request to write data.

12. The non-transitory computer readable medium of claim 8, wherein processing the at least one I/O request comprises issuing data directly from the GPU memory to a communication fabric using a remote direct memory access (RDMA) engine on the client application node, wherein the communication fabric operatively connects the client application node to the storage pool.

13. The non-transitory computer readable medium of claim 8, wherein the location in the storage pool is a location in a memory device and wherein the memory device is a persistent memory (PMEM) device.

14. The non-transitory computer readable medium of claim 8, wherein the GPU module executes in an operating system (OS) of the client application node.

15. A client application node, comprising:
a hardware processor;
a graphics processing unit (GPU);
an application container executing on the hardware processor and comprising an application;
a client file system (FS) container executing on the hardware processor and comprising a memory hypervisor module; and
an operating system (OS) executing on the hardware processor and comprising a GPU module, wherein the client FS container is configured to:
receive, from the OS, a request to write data to a storage pool operatively connected to the client application node;

wherein the memory hypervisor module is configured to:
generate at least one input/output (I/O) request,
wherein the at least one I/O request specifies a location in the storage pool and a physical address of data in a GPU memory in the GPU,
wherein the location is determined using a data layout,
wherein the data layout provides a mapping between a [file, offset] and a [scale out volume (SOV), offset] and the SOV is associated with the storage pool,
wherein the SOV provides a layer of abstraction between a sparse virtual space associated with the client application node and storage devices of the storage pool,
wherein the storage devices are scalable in size without impacting interaction between the SOV and the client application node, and
wherein the physical address is determined using the GPU module; and
issue the at least one I/O request to the storage pool,
wherein processing the at least one I/O request results in at least a portion of the data being stored at the location, and
wherein a commit of a data layout based on the I/O request is sent to a metadata node operatively connected to the client application node and the storage pool, and a previous data layout associated with the client application node on the metadata node is invalidated.

16. The client application node of claim 15,
wherein the data is associated with a [file, offset] and a virtual address,
wherein the GPU module provides a mapping between the virtual address and the physical address.

17. The client application node of claim 16, wherein the request to write data to the storage pool is initiated by the application, wherein the application is a GPU-aware application.

18. The client application node of claim 17, wherein the GPU module registers the physical address with a remote direct memory access (RDMA) engine on the client application node prior the application issuing the request to write data.

19. The client application node of claim 15, wherein processing the at least one I/O request comprises issuing data directly from the GPU memory to a communication fabric using a remote direct memory access (RDMA) engine on the client application node, wherein the communication fabric operatively connects the client application node to the storage pool.

20. The client application node of claim 15, wherein the location in the storage pool is a location in a memory device and wherein the memory device is a persistent memory (PMEM) device.

* * * * *